United States Patent
Cao

(10) Patent No.: US 11,159,662 B2
(45) Date of Patent: Oct. 26, 2021

(54) MOBILE TERMINAL AND DISPLAY METHOD

(71) Applicant: ZTE Corporation, Guangdong (CN)

(72) Inventor: Li Cao, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/623,995

(22) PCT Filed: Apr. 13, 2018

(86) PCT No.: PCT/CN2018/082944
§ 371 (c)(1),
(2) Date: Dec. 18, 2019

(87) PCT Pub. No.: WO2018/233357
PCT Pub. Date: Dec. 27, 2018

(65) Prior Publication Data
US 2020/0177718 A1 Jun. 4, 2020

(30) Foreign Application Priority Data
Jun. 19, 2017 (CN) .......................... 201710467395.X

(51) Int. Cl.
*H04M 1/02* (2006.01)
*G06F 1/16* (2006.01)
(Continued)

(52) U.S. Cl.
CPC ........ *H04M 1/0268* (2013.01); *G06F 1/1652* (2013.01); *G06F 3/14* (2013.01); *G06F 3/0481* (2013.01)

(58) Field of Classification Search
CPC ............. H04M 1/0268; H04M 1/0237; H04M 2201/38; H04M 1/026
See application file for complete search history.

(56) References Cited

U.S. PATENT DOCUMENTS 9,258,396 B2 * 2/2016 Hwang ................. G06F 1/1677
9,560,750 B2 * 1/2017 Lee ...................... H04M 1/0202
(Continued)

FOREIGN PATENT DOCUMENTS

| CN | 102123187 A | 7/2011 |
|---|---|---|
| CN | 103929530 A | 7/2014 |

(Continued)

*Primary Examiner* — Keith Ferguson

(57) ABSTRACT

A mobile terminal includes a main body and a flexible screen disposed on the main body. The main body includes an upper main body and a lower main body separately disposed. The mobile terminal includes a rotation shaft structure and a first support structure for supporting the flexible screen. The rotation shaft structure is located in the upper main body and the first support structure winds around the rotation shaft structure. One portion of the flexible screen is embedded in the lower main body and located on a surface facing a user. A back surface of the other portion is attached to a surface of the first support structure remote from the rotation shaft structure. When the upper main body is separated from or attached to the lower main body, deployment and retraction of the first support structure may be realized by rotating the rotation shaft structure.

16 Claims, 11 Drawing Sheets

(51) Int. Cl.
*G06F 3/14* (2006.01)
*G06F 3/0481* (2013.01)

(56) References Cited

U.S. PATENT DOCUMENTS

2011/0176260 A1* 7/2011 Walters ................. G06F 1/1641
    361/679.01
2015/0261259 A1* 9/2015 Endo ....................... G06F 3/042
    361/679.06
2017/0293383 A1* 10/2017 Lee ....................... G06F 1/1641

FOREIGN PATENT DOCUMENTS

| CN | 103941816 A | 7/2014 |
| CN | 104714699 A | 6/2015 |
| CN | 106713554 A | 5/2017 |

* cited by examiner

MOBILE TERMINAL AND DISPLAY METHOD

CROSS-REFERENCE TO RELATED APPLICATIONS

This application is the United States National Phase of PCT Patent Application No. PCT/CN2018/082944 filed on 13 Apr. 2018, which claims priority to Chinese Patent Application No. 201710467395.X filed 19 Jun. 2017, both of which are incorporated herein by reference.

TECHNICAL FIELD

The present disclosure relates to, but is not limited to the field of terminal technologies, and in particular to, a mobile terminal and a display method.

BACKGROUND

With the improvement of people's living standard, mobile terminals play an increasingly important role in people's lives.

SUMMARY

The following is summary of the subject matters detailed herein. This summary is not intended to limit the scope of protection of the claims.

Screens used by mobile terminals in the market each have a fixed size: some mobile terminals use a small screen, and mobile phones with the small screen are easy to carry, such as 4.5-inch or 5-inch screens, but when watching videos or playing games by the mobile phones with the small screen, there is poor sensory experience because of the small screen; while some mobile terminals use a large screen, such as 6-inch or 6.5-inch screens, when watching videos or playing games by mobile phones with a large screen, a better sensory experience may be imparted to a user, but be inconvenient to take because of too large volume.

The present disclosure provides a mobile terminal and a display method, which can realize free switching of the screen size of the mobile terminal.

The present disclosure provides a mobile terminal, comprising a main body and a flexible screen disposed on the main body, the main body comprising an upper main body and a lower main body which are separately disposed. The terminal further includes a rotation shaft structure and a first support structure for supporting the flexible screen.

The rotation shaft structure is located in the upper main body, and the first support structure winds around the rotation shaft structure.

A portion of the flexible screen is embedded in a lower main body and is located on a surface facing the user; a back surface of the other portion is attached to a surface of the first support structure away from the rotation shaft structure, herein the surface of the flexible screen facing the user is a front surface.

When the upper main body is separated from or attached to the lower main body, the rotation shaft structure is rotated to realize the deployment and retraction of the first support structure.

In an exemplary embodiment, the mobile terminal further includes:

a second support structure, the second support structure is attached to two sides, or a back surface, or the two sides and the back surface of the mobile terminal, and supports the upper main body and the lower main body to make them in a same plane when the upper main body is separated from or attached to the lower main body.

In an exemplary embodiment, the second support structure includes a first support sub-structure and a second support sub-structure slidably connected to the first support sub-structure.

An end of the first support sub-structure along a sliding direction and away from the second support sub-structure is fixedly connected to the upper main body, and an end of the second support sub-structure along the sliding direction and away from the first support sub-structure is fixedly connected to the lower main body.

In an exemplary embodiment, the second support structure further includes: a locking structure.

The locking structure includes a locking step and a locking groove at the other end of the first support sub-structure, and a locking convex hull at one end of the second support sub-structure.

When the locking convex hull is located in the locking groove, the locking step catches the locking convex hull.

In an exemplary embodiment, the first support structure includes a trapezoidal plate having a trapezoidal cross section, a connection structure, and a fixed bar, and the trapezoidal plate includes an upper bottom surface, a lower bottom surface, and trapezoidal surfaces at both ends of the trapezoidal plate and two side surfaces intersecting with the trapezoidal surface.

The connection structure connects side surfaces of adjacent trapezoidal plates and sequentially connects a plurality of trapezoidal plates.

The flexible screen is attached to the lower bottom surface of the trapezoidal plate;

An upper bottom surface of one of the trapezoidal plates located on either side of the plurality of trapezoidal plates connected in sequence is fixedly connected to the shaft structure, and the other trapezoidal plate is fixed to an inner surface of the lower main body via the fixed bar.

In an exemplary embodiment, the first support structure further includes: a connection chain.

A wide hole is disposed on the trapezoidal surface of the trapezoidal plate, and the connection chain connects adjacent trapezoidal plates through wide holes in the adjacent trapezoidal plates.

In an exemplary embodiment, the connection structure includes:

a circular hole and a connection rod located on either side surface of the trapezoidal plate, herein the circular holes from each side surface of the trapezoidal plate are in a straight line.

The connection rod passes through circular holes from adjacent side surfaces of the adjacent trapezoidal plates, to connect the plurality of trapezoidal plates.

In an exemplary embodiment, the rotation shaft structure includes:

an axial center, a barrel and a spring, the axial center comprising a first axial center and a second axial center.

The first axial center and the second axial center are connected by the spring and attached in the barrel, and the first support structure winds around the barrel.

In an exemplary embodiment, one end of the first axial center connected to the spring and one end of the second axial center connected to the spring are provided with a positioning post, respectively, and there is an interference fit between the spring and the positioning post.

In an exemplary embodiment, the other end of the first axial center and the other end of the second axial center are provided with rotation teeth, and both ends of the barrel are provided with fixed teeth.

When the rotation teeth are engaged with the fixed teeth, the rotation shaft is in a locked state;

When the rotation teeth is misaligned with the fixed teeth, the rotation shaft is in an unlocked stat.

In an exemplary embodiment, the upper main body includes: a button on a left or right side of the upper main body, a light sensation and a proximity sensor, an earpiece, a front camera and a sub-board; the light sensation, the proximity sensor, the earpiece and the front camera are mounted on the sub-board and disposed inside the upper main body.

A mainboard is disposed in the lower main body, and the mainboard and the sub board are connected by a conductive wire, herein the conductive wire is in a bent state when the upper main body is attached to the lower main body.

The present disclosure further provides a display method, which is applied to the mobile terminals as described above, and the display method includes:

acquiring a switching instruction of a flexible screen display state in the mobile terminal;

controlling, according to the switching instruction, the flexible screen to switch to a corresponding display state, herein the display state includes a first display state and a second display state, herein the first display state is a state in which the flexible screen is displayed in full screen, and the second display state is a state in which the flexible screen embedded in the lower main body of the mobile terminal is displayed.

In an exemplary embodiment, the step of acquiring the switching instruction of the flexible screen display state in the mobile terminal includes:

receiving a flexible screen display state switching instruction triggered by a menu button displayed on the flexible screen of the mobile terminal.

In an exemplary embodiment, the mobile terminal further includes: a distance detection device for detecting a distance between the upper main body and the lower main body of the mobile terminal, herein the step of acquiring the switching instruction of the flexible screen display state in the mobile terminal further includes:

detecting the distance between the upper main body and the lower main body via the distance detection device;

generating a corresponding switching instruction according to the distance.

In an exemplary embodiment, after the step of detecting the distance between the upper main body and the lower main body by the distance detection device, the method further includes:

determining a relationship between the distance and a preset value;

if the distance is greater than or equal to the preset value, prompting the user to stretch the mobile terminal, and generating a switching instruction of the first display stat;

if the distance is less than the preset value, prompting the user to compress the mobile terminal, and generating a switching instruction of the second display state.

In an exemplary embodiment, the display state further includes a third display state, herein the third display state is a state in which the partial flexible screen located in the upper main body and the flexible screen embedded in the lower main body of the mobile terminal are displayed together.

Embodiments of the present disclosure also provide a computer-readable storage medium storing computer-executable instructions, and the foregoing display methods are implemented when the computer-executable instructions are executed.

The mobile terminal of the present disclosure includes a main body and a flexible screen disposed on the main body, and the main body includes an upper main body and a lower main body provided separately. The mobile terminal further includes a rotation shaft structure and a support structure for supporting the flexible screen. The rotation shaft structure is located in the upper main body, and the first support structure winds around the rotation shaft structure; a portion of the flexible screen is embedded in the lower main body and located on a surface facing a user; a back surface of the other portion is attached to a surface of the first support structure remote from the rotation shaft structure, herein the surface of the flexible screen facing the user is a front surface; when the upper main body is separated from or attached to the lower main body, the rotation shaft structure is rotated to realize the deployment and retraction of the first support structure. In the above manner, the mobile terminal of the present disclosure is divided into the upper main body and the lower main body, and the extension and shortening of the screen of the mobile terminal are realized by the rotation shaft structure and the first support structure provided in the upper main body by utilizing the characteristics of the bendable accommodation of the flexible screen. When the user needs a large screen, the upper main body is separated from the lower main body, and the flexible screen and the first support structure are released through the rotation shaft structure, so that the screen of the mobile terminal is increased; when the large screen is not required, the upper main body is attached to the lower main body, the flexible screen and the first support structure are retracted through the rotation shaft structure, so that the screen of the mobile terminal becomes smaller, thereby realizing free switch of the mobile terminal between the large screen and the small screen and having dual advantages of both the large screen and the small screen.

After reading and understanding the accompanying drawings and detailed description, other aspects may be known.

DETAILED DESCRIPTION

Embodiments of the present disclosure will be described below in conjunction with the accompanying drawings.

The present disclosure provides a mobile terminal.

Figure 1:
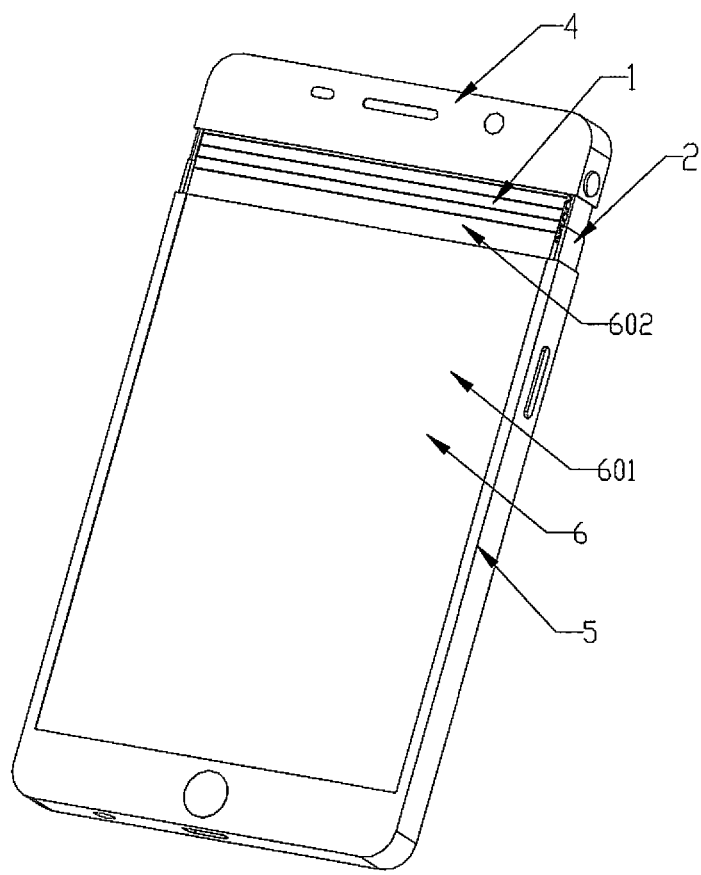
FIG. 1 is a schematic structural diagram of an embodiment of a mobile terminal according to the present disclosure.
Figure 2:
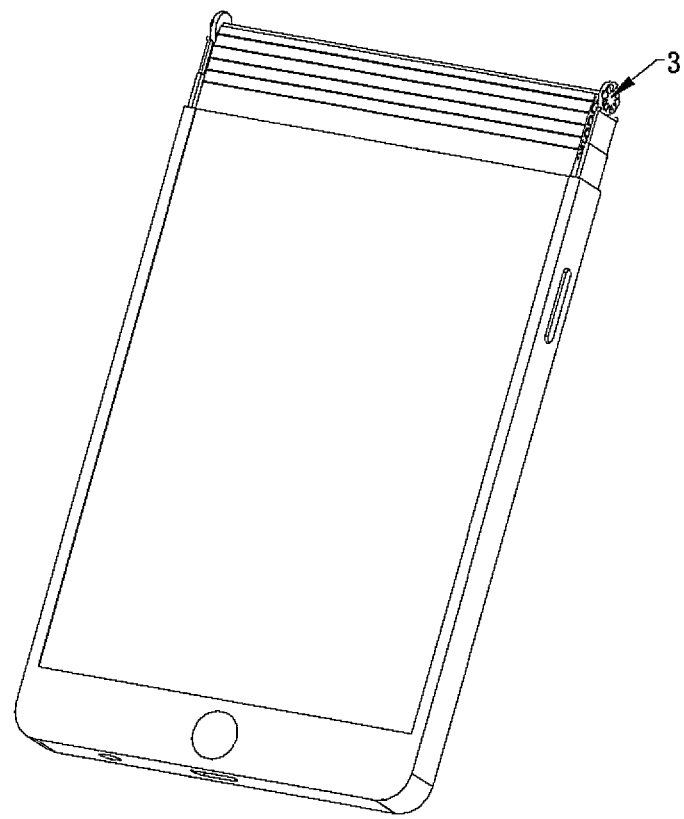
FIG. 2 a schematic structural diagram of an embodiment of a mobile terminal according to the present disclosure in which an upper main body has been removed.

With reference to FIG. 1 and FIG. 2, FIG. 1 is a schematic structural diagram of an embodiment of a mobile terminal according to the present disclosure; FIG. 2 is a schematic structural diagram of an embodiment of a mobile terminal according to the present disclosure in which an upper main body has been removed.

The mobile terminal includes a main body and a flexible screen 6 disposed on the main body, the main body comprising an upper main body 4 and a lower main body 5, and the mobile terminal further comprising a rotation shaft structure 3 and a first support structure 1 for supporting the flexible screen 6.

The rotation shaft structure 3 is located in the upper main body 4, and the first support structure 1 winds around the rotation shaft structure 3.

A portion of the flexible screen 6 is embedded in the lower main body 5 and located on a surface facing a user; a back surface of the other portion is attached to a surface of the first support structure 1 remote from the rotation shaft structure 3, herein the surface of the flexible screen 6 facing the user is a front surface.

When the upper main body 4 is separated from or attached to the lower main body 5, the rotation shaft structure 3 is rotated to realize the deployment and retraction of the first support structure 1.

As shown in FIG. 1, the mobile terminal of the present disclosure includes a main body and a flexible screen 6 disposed on the main body, herein the main body includes an upper main body 4 and a lower main body 5, and the upper main body 4 is provided with a camera, a loudspeaker, and the like, and the lower main body 5 includes a flexible screen 6, a mainboard, and the like, and the upper main body 4 and the lower main body 5 are similar to structures of mobile terminals in the existing art, except that the upper main body 4 is provided with the rotation shaft structure 3 and the flexible screen 6 winding around the rotation shaft structure 3 and the first support structure 1. The display screen included in the lower main body 5 is a flexible screen 6 integral with the flexible screen 6 in the upper main body 4. This embodiment is illustrated by taking the surface facing the user in the mobile terminal as the front surface, that is, the surface containing the display screen as the front surface.

The two portions of the flexible screen 6 located in the upper main body 4 and the lower main body 5 may be defined as a flexible screen fixed portion 601 and a flexible screen movable portion 602, respectively, and the difference between the two portion is that the flexible screen movable portion 602 is located above the first support structure 1 and attached closely to the first support structure 1 for curling movement and flattening movement as a whole. When the flexible screen 6 curls, the flexible screen movable portion 602 will be accommodated inside the main body and not be displayed outside. When the flexible screen 6 is flattened, the flexible screen movable portion 602 is flattened and displayed outside, and the screen size of the main body is increased.

The rotation shaft structure 3 is located in the upper main body 4. By removing the upper main body 4, it can be seen that the first support structure 1 along with the flexible screen movable portion 602 wind around the rotation shaft structure 3, and the rotation shaft structure 3 is rotated to realize the extension and retraction of the first support structure 1 along with the flexible screen 6.

When the main body is extended, the upper main body 4 is separated from the lower main body 5, and the flexible screen movable portion 602 is flattened and displayed outside so that the screen size of the main body is increased. Optionally, since the flexible screen 6 of the mobile terminal is different in size when the main body is extended or not, contents displayed on the flexible screen 6 is also different. In order to facilitate the user to watch, in an optional implementation, when the main body is extended, the user can trigger a display mode switching instruction via a display menu of the mobile terminal, and the mobile terminal is switched from a small-screen display mode to a large-screen display mode, and the user retriggers the display mode switching instruction, and the mobile terminal is switched from the large-screen display mode to the small-screen display mode.

Further, for the convenience of the user, an infrared emitting device and an infrared receiving device may be installed on the upper main body 4 and the lower main body 5, respectively, and the infrared emitting device and the infrared receiving device cooperate to detect the distance between the upper main body 4 and the lower main body. A median distance is then set by software. When the distance between the upper main body 4 and the lower main body 5 detected by an infrared distance sensor is less than the median distance, it is speculated that the user has the willingness to reduce the screen, and continues to detect and determine whether the distance between the upper main body 4 and the lower main body 5 is less than a certain threshold lower limit, and if determining that the distance is less than the threshold lower limit, the software controls screen to make it in a small-screen display state, and only the flexible screen fixed portion 601 displays an image. If the distance between the upper main body 4 and the lower main body 5 detected is less than the median distance but greater than the threshold lower limit, the screen prompts the user to "continue to compress the mobile phone to the minimum length".

When the infrared distance sensor detects that the distance between the upper main body 4 and the lower main body is greater than the median distance, it is speculated that the user has the willingness to increase the screen, and continues to detect and determine whether the distance between the upper main body 4 and the lower main body 5 is greater than a certain threshold upper limit, and if determining that the distance is greater than the threshold upper limit, the software controls screen to make it in a large-screen display state, and the fixed portion and movable portion of the flexible screen 6 cooperate to display an image, and the screen of the main body increases. If detecting that the distance between the upper main body 4 and the lower main body 5 is greater than the median distance but less than the threshold upper limit, the screen prompts the user to "continue to stretch the mobile phone to the maximum length".

The mobile terminal of the present disclosure includes a flexible screen, an upper main body, a lower main body, a rotation shaft structure and a first support structure for supporting the flexible screen; a portion of the flexible screen is embedded in the lower main body and located on a surface facing a user, a back surface of the other portion is attached to the first support structure, herein the surface of the flexible screen facing the user is a front surface; the rotation shaft structure is located in the upper main body and the first support structure winds around the rotation shaft structure; when the upper main body is separated from or attached to the lower main body, the rotation shaft structure is rotated to realize the deployment and retraction of the first support structure, and when the upper main body is separated from the lower main body, the rotation shaft structure is located on a side of the first support structure facing away from the flexible screen. By the above manner, the mobile terminal of the present disclosure is divided into an upper main body and a lower main body, and the extension and shortening of the screen of the mobile terminal are realized by the rotation shaft structure and the first support structure disposed in the upper main body by utilizing the characteristics of the bendable accommodation of the flexible screen. When a user needs a large screen, the upper main body and the lower main body are separated and the flexible screen and the first support structure are released through the rotation shaft structure, so that the screen of the mobile terminal is increased; when the large screen is not required, the upper main body is attached to the lower main body, the flexible screen and the first support structure are retracted through the rotation shaft structure, so that the screen of the mobile terminal becomes smaller, thereby realizing free switch of the mobile terminal between the large screen and the small screen and having dual advantages of both the large screen and the small screen.

Further, in order to facilitate the user to use and at the same time protect the flexible screen 6 from being damaged due to improper use when the mobile terminal is extended, the mobile terminal further includes:

a second support structure 2, which is attached to two sides and/or a back surface of the mobile terminal, and supports the upper main body 4 and lower main body 5 to make them in the same plane when the upper main body 4 is separated from or attached to the lower main body 5.

In this embodiment, the second support structure includes a first support sub-structure 201 and a second support sub-structure 202 slidably connected to the first support sub-structure 201.

An end of the first support sub-structure 201 along a sliding direction and away from an end of the second support sub-structure 202 is fixedly connected to the upper main body 4, and an end of the second support sub-structure 202 along the sliding direction and away from the first support sub-structure 201 is fixedly connected to the lower main body 5.

Figure 3:
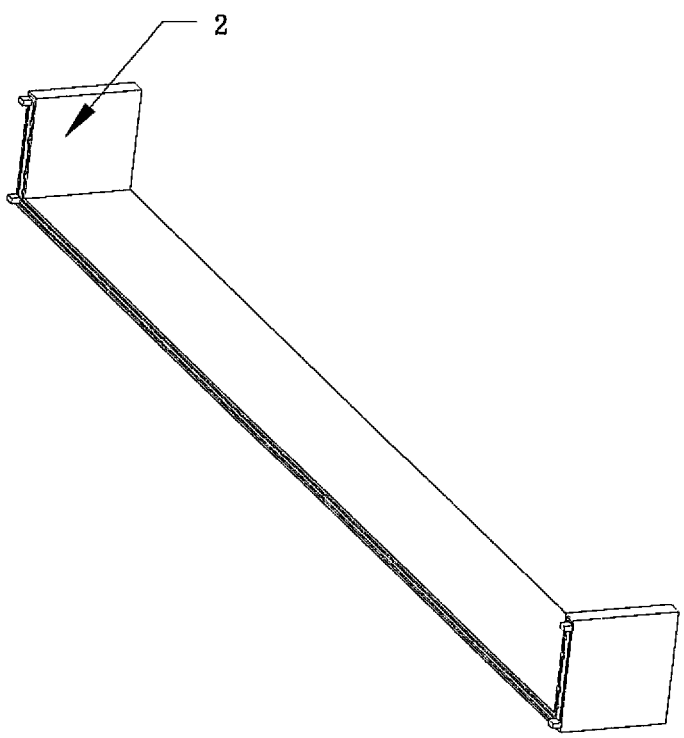
FIG. 3 is a schematic structural diagram of a second support embodiment of the present disclosure.
Figure 4:
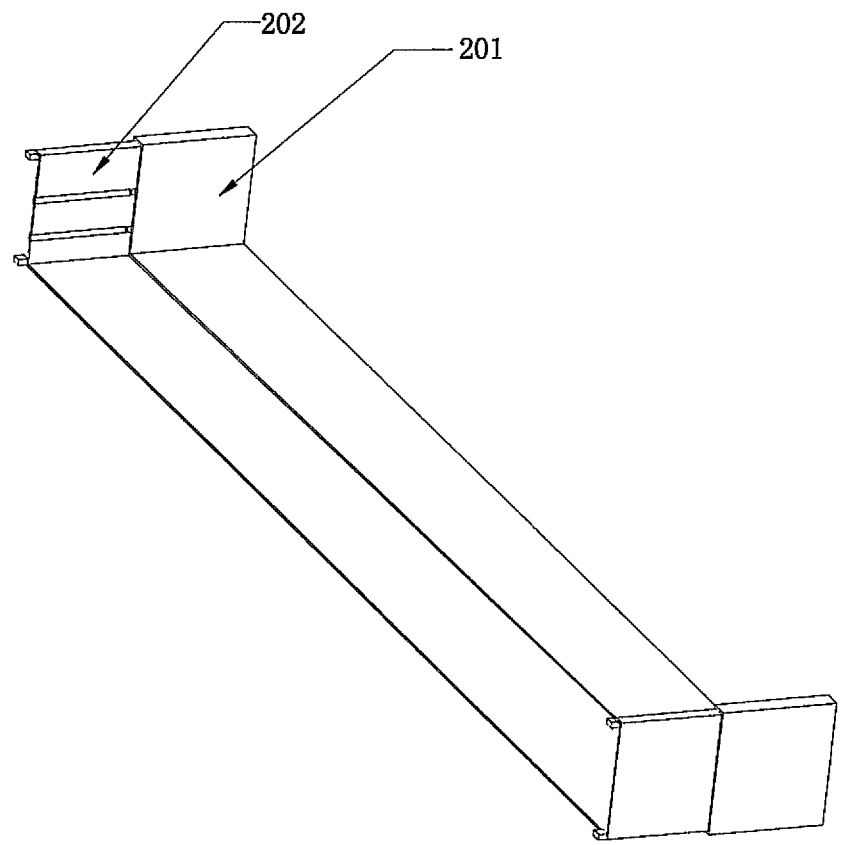
FIG. 4 is a schematic structural diagram of a second support structure in an extended state according to an embodiment of the present disclosure.

With reference to FIG. 1, FIG. 3 and FIG. 4, in the embodiment, the second support structure 2 is a hollow cavity structure, and the second support structure 2 is attached to both sides and the back surface of the mobile terminal, which is equivalent to wrapping around the mobile terminal. The second support structure 2 includes a first support sub-structure 201 and a second support sub-structure 202, herein the first support sub-structure 201 is fixedly connected with the upper main body 4, and the second support sub-structure 202 is fixedly connected with the lower main body 5, and the fixing manner may be adhesive, spot welding or blanching, and so on. In an optional implementation, the second support structure 2 may also be a structure similar to a slide track for a drawer, and the second support structure 2 may be located at two sides of the mobile terminal.

When the main body support structure 2 needs to be retracted, the second support sub-structure 202 is accommodated in a cavity of the first support sub-structure 201, and the overall structure after retracting may be as shown in FIG. 3.

When the main body is extended, the upper main body 4 is separated from the lower main body 5, and the main body support structure 2 is extended accordingly, herein the first support sub-structure 201 and the second support sub-structure 202 are completely deployed, and the state is as shown in FIG. 4.

Figure 5:
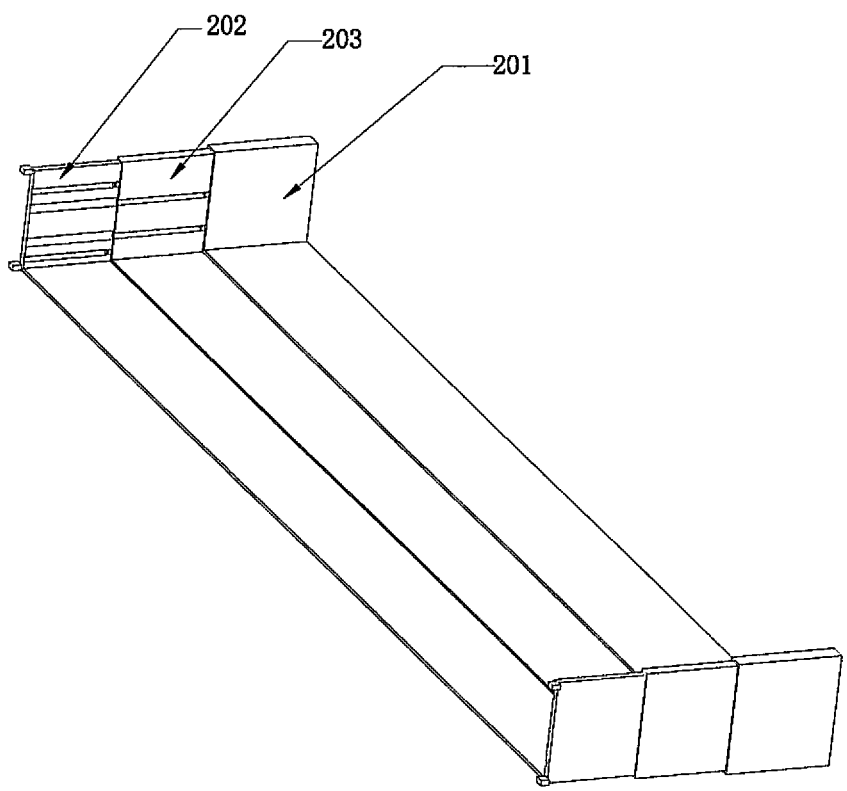
FIG. 5 is another schematic structural diagram of a second support structure in an extended state according to an embodiment of the present disclosure.
Figure 6:
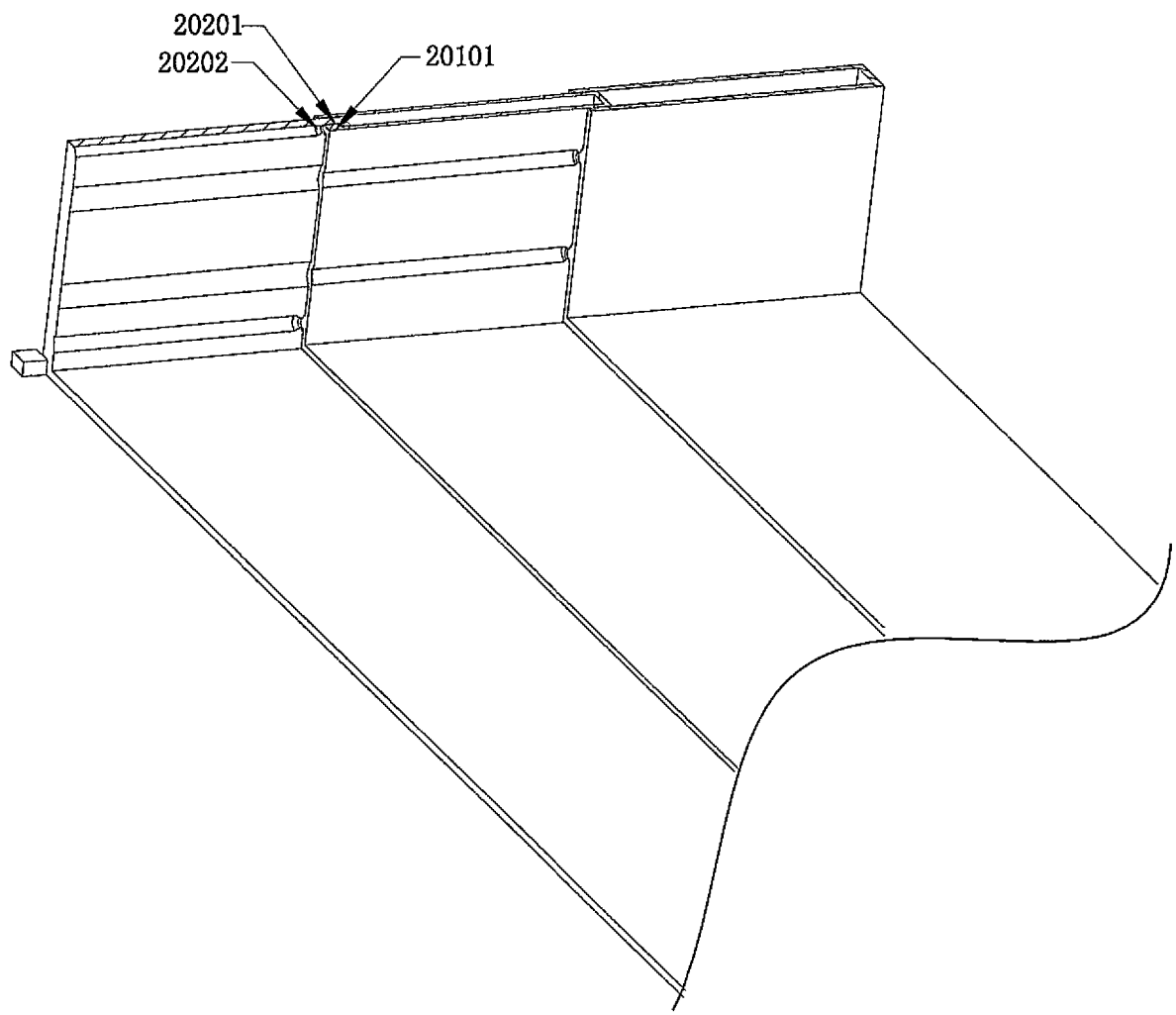
FIG. 6 is a partial perspective structural diagram of a second support structure in an extended state according to an embodiment of the present disclosure.
Figure 7:
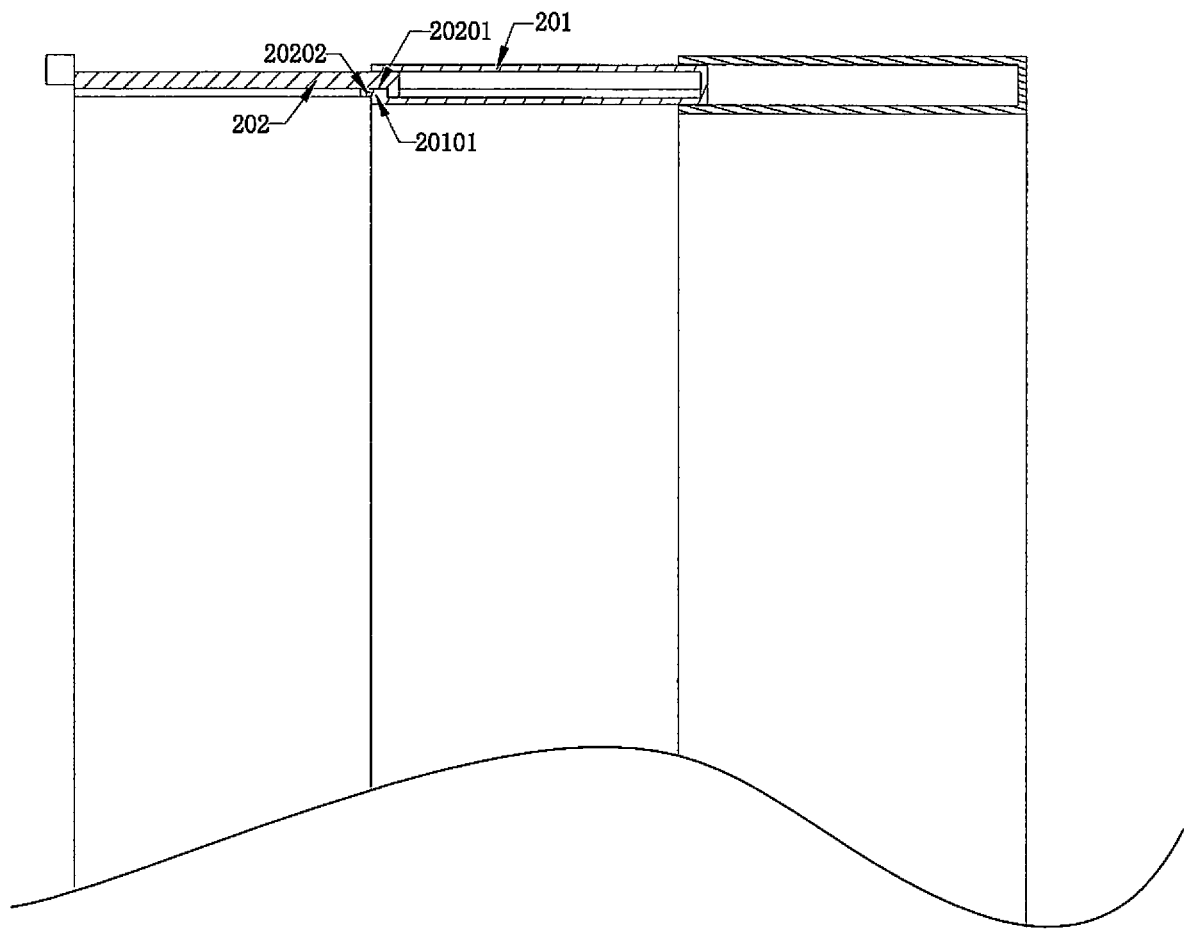
FIG. 7 is a partial front elevational diagram of a second support structure in an extended state according to an embodiment of the present disclosure.

In an optional implementation, the second support structure 2 may further include a plurality of third support sub-structures 203, such as a support plate, which are similar to the structures of the support sub-structure 201 and the second support sub-structure 202, and are located between the first support sub-structure 201 and the second support sub-structure 202, and slidably connected to the first support sub-structure 201 and the second support sub-structure 202, respectively. As shown in FIG. 5, when the main body is extended, the upper main body 4 is separated from the lower main body 5, and the main body support structure 2 is extended accordingly, herein the first support sub-structure 201, the second support sub-structure 202 and the third support sub-structures 203, for example, three support plates, are completely deployed, as shown in FIG. 5.

Optionally, in order to facilitate the user to use and avoid the mobile terminal from being damaged due to excessive extension of the mobile terminal by the user when extending the main body. In the embodiment, the second support structure further includes a locking structure.

The locking structure includes a locking convex hull at the other end of the first support sub-structure 201, and a locking step and a locking groove 20201 at one end of the second support sub-structure.

When the locking convex hull is located in the locking groove 20201, the locking step catches the locking convex hull.

With reference to FIG. 6 to FIG. 9, an extended locking structure is disposed between each segment support plate of the main body support structure 2. Taking the locking structure between the first support sub-structure 201 and the second support sub-structure 202 as an example, a head of the first support sub-structure 201 has a locking convex hull 20101, and the end of the second support sub-structure 202 has a locking step 20202 and a locking groove 20201. When the main body support structure 2 is extended, the second support sub-structure 202 and the first support sub-structure 201 relatively slide until the locking convex hull 20101 at the head of the first support sub-structure 201 contacts the locking step 20202 at the end of the second support sub-structure 202, and needs to be stretched slightly, so that the locking convex hull 20101 passes over the locking step 20202 and enters the locking groove 20201, the second support sub-structure 202 does not completely slide out of the cavity of the first support sub-structure 201, and is in a temporarily fixed position. When the main body support structure 2 is retracted, the second support sub-structure 202 needs to be compressed slightly, so that the locking convex hull 20101 at the head of the first support sub-structure 201 passes over the locking step 20202 at the end of the second support sub-structure 202, and then leaves the locking step 20202. At this time, the second support sub-structure 202 may be retracted back into the cavity of the first support sub-structure 201.

Figure 8:
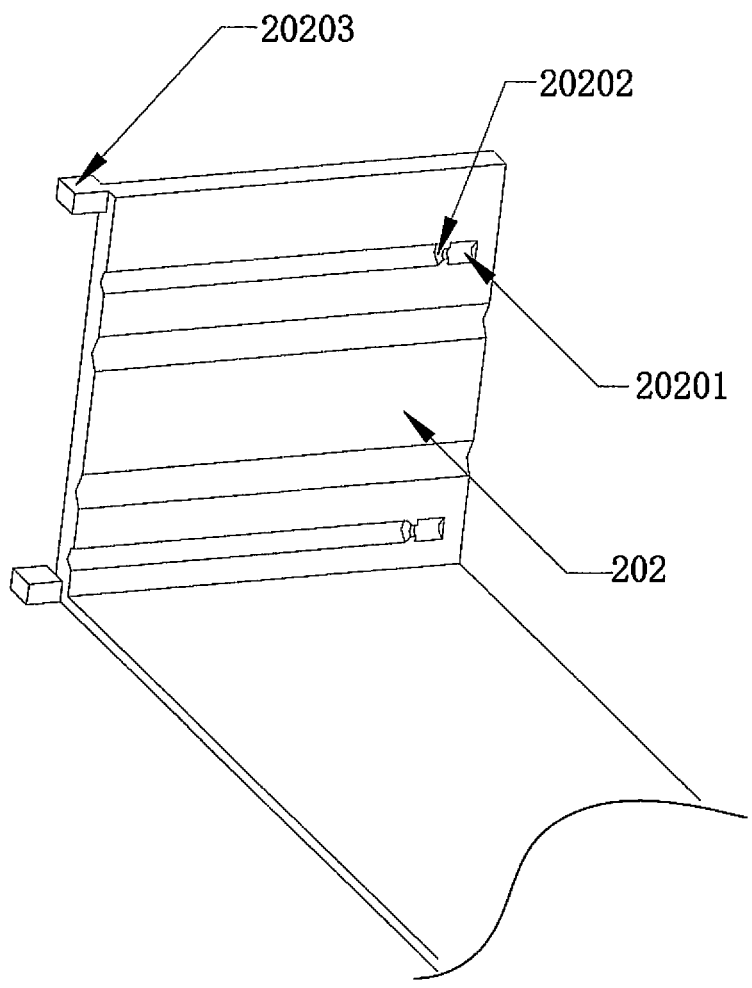
FIG. 8 is a partial schematic structural diagram of a sub-support structure in a second support structure according to an embodiment of the present disclosure.

If the second support structure 2 includes a plurality of sub-support structures, each sub-support structure may be as shown in FIG. 8, and the two sub-support structures that are slidably connected may constitute a lock structure.

Figure 9:
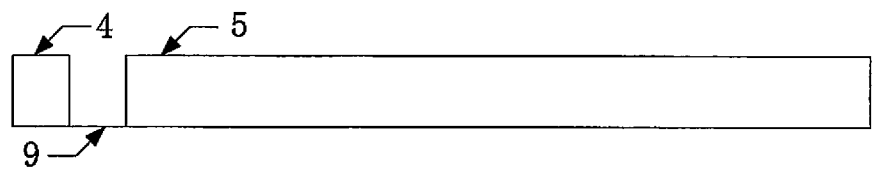
FIG. 9 is another schematic structural diagram of a second support structure in an extended state according to an embodiment of the present disclosure.

Optionally, in an optional implementation, the second support structure 2 may also be as shown in FIG. 9, that is, the second support structure 2 is an extension plate attached to the back surface of the lower main body 5, and when the upper main body 4 is attached to or separated from the lower main body 5, the second support structure 2 may support the upper main body 4. For aesthetic reasons, the width of the second support structure 2 may be the same as the width of the upper main body 4.

Figure 10:
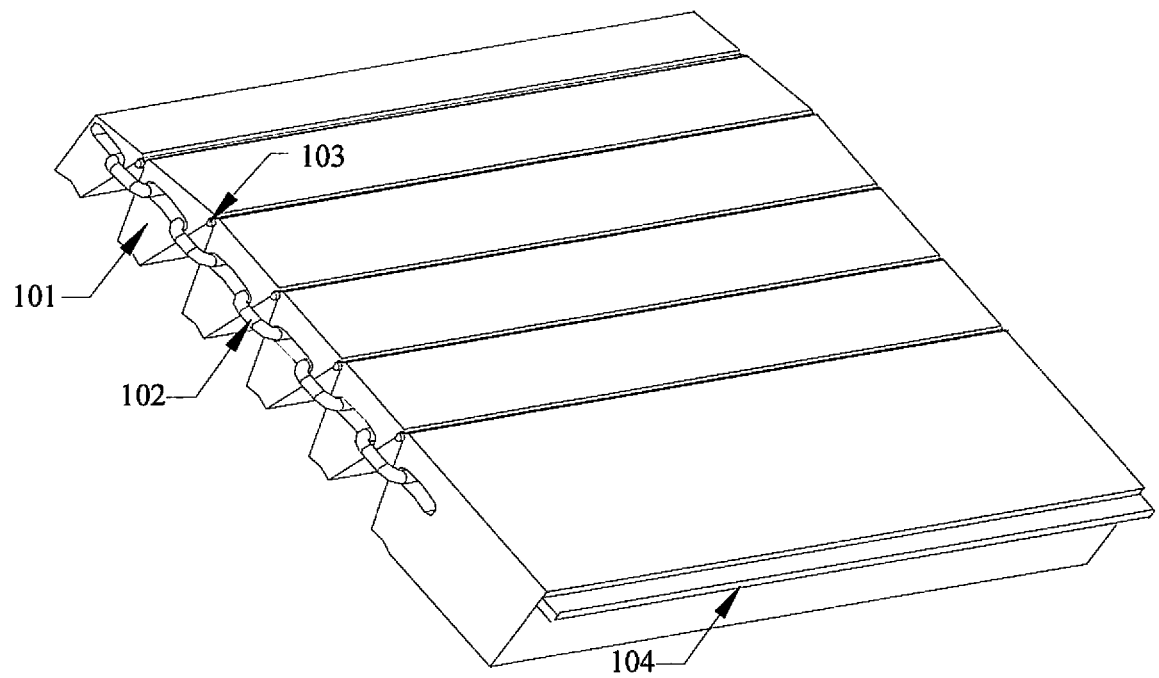
FIG. 10 is a schematic structural diagram of a first support structure according to an embodiment of the present disclosure.
Figure 11:
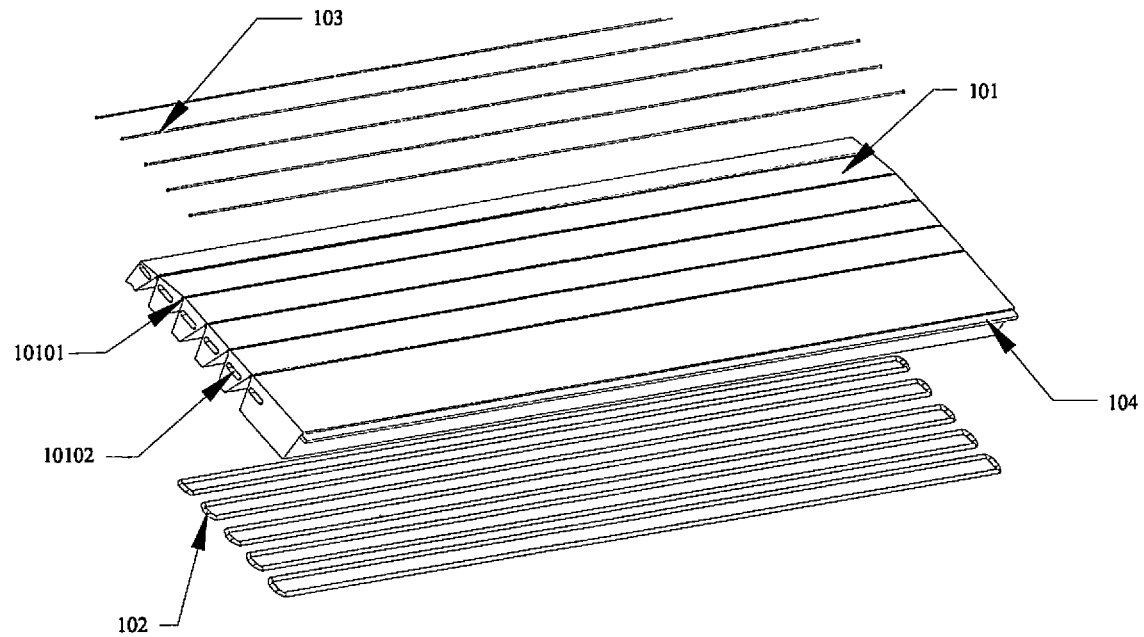
FIG. 11 is a schematic diagram of an exploded structure of a first support structure according to an embodiment of the present disclosure.
Figure 12:
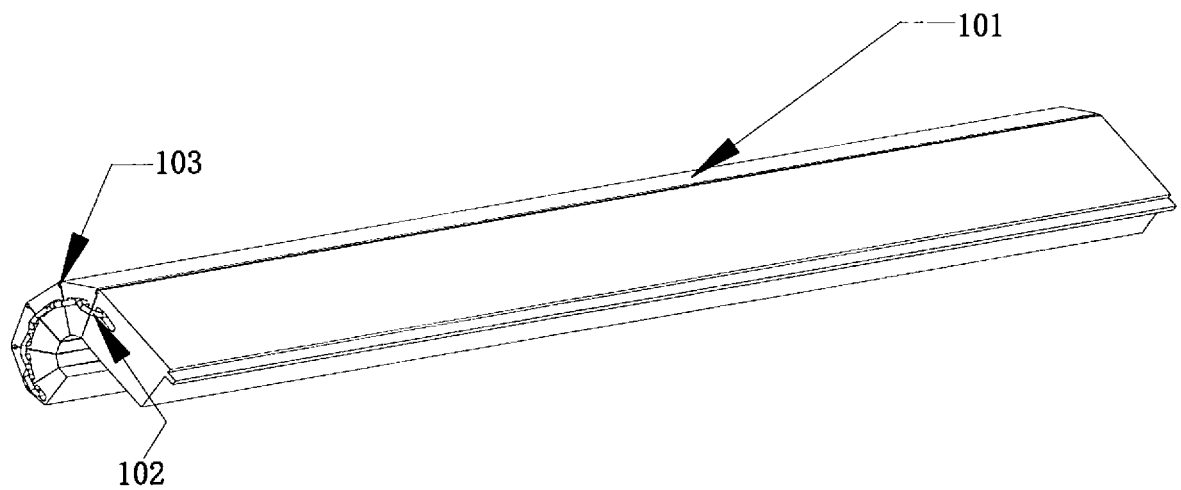
FIG. 12 is a schematic structural diagram of a first support structure in a retracted state according to an embodiment of the present disclosure.

With reference to FIG. 10 to FIG. 12, based on the above embodiments, the first support structure 1 in the embodiment includes a trapezoidal plate 101 having a trapezoidal cross section, a connection structure 103 and a fixed strip 104. The trapezoidal plate 101 includes an upper bottom surface, a lower bottom surface, a trapezoidal surface located at both ends of the trapezoidal plate 101 and two side surfaces intersecting with the trapezoidal surface.

The connection structure 103 is connected to the side surface of the adjacent trapezoidal plate 101, and a plurality of trapezoidal plates 101 are sequentially connected.

The flexible screen 6 is attached to the lower bottom surface of the trapezoidal plate 101.

The upper bottom surface of one of the trapezoidal plates 101 at the left side and right side of the sequentially connected plurality of trapezoidal plates 101 is fixedly connected to the rotation shaft structure 3, and the other trapezoidal plate 101 is fixed to an inner surface of the lower main body 5 by the fixed strip 104.

In this embodiment, the first support structure 1 includes a plurality of trapezoidal plates 101. Each of the trapezoidal plates 101 includes an upper bottom surface, a lower bottom surface, a trapezoidal surface and two side surfaces. The trapezoidal plate 101 is made of a hard material, and the trapezoidal plate 101 is flattened to support the flexible screen 6 on the surface when the main body is extended. When the main body is shortened, the trapezoidal plate 101 and the flexible screen 6 on the surface wind around the rotation shaft 3 and serve to retract the flexible screen 6.

The plurality of trapezoidal plates 101 are sequentially connected through the connection structure 103. Optionally, the connection structure 103 in this embodiment includes:

a circular hole 10101 and a connection rod on both sides of the trapezoidal plate 101, herein the circular hole 10101 on each side of the trapezoidal plate 101 is in a straight line.

The connection rod passes through a circular hole 10101 on an adjacent surface of the adjacent trapezoidal plate 101.

Optionally, the first support structure 1 further includes a connection chain 102.

A wide hole 10102 is disposed on the trapezoidal surface of the trapezoidal plate 101, and the connection chain 102 connects the adjacent trapezoidal plate 101 through the wide hole 10102 on the adjacent trapezoidal plate 101.

In the embodiment, the circular holes 10101 are disposed on the two sides of each of the trapezoidal plates 101. The circular holes 10101 on each side of the trapezoidal plate 101 are in a straight line, and the circular holes 10101 on the adjacent sides of the adjacent trapezoidal plates 101 are dislocated, so that the connection rod can pass through the circular hole 10101 on the adjacent trapezoidal plate 101, thereby connecting the adjacent trapezoidal plates 101. In an optional embodiment, the connection structure 103 may be a hinge.

The connection chain 102 passes through the wide hole 10102 on the side of the trapezoidal plate 101 and connects the adjacent two trapezoidal plates 101, and serve to a limit. When the first support structure 1 is bent toward the direction of the rotation shaft, the connection chain 102 is in a relaxed state; when the first support structure 1 is completely flattened, the connection chain 102 is tightened, so that the first support structure 1 as a whole may only be bent toward the direction of the rotation shaft 3 or fully flattened, but not bent toward the opposite direction.

The connection rod 103 passes through the circular hole 10101 on the side of the support plate 101, and connects the adjacent two support plates 101 so that the adjacent two support plates 101 can rotate around the intermediate connection rod 103.

The side of the surface of the trapezoidal plate 101 is defined as two ends of sequentially connected plurality of trapezoidal plates 101, and the direction of the sequential connection is the left and right sides of the plurality of trapezoidal plates 101, that is, the left and right sides of the plurality of trapezoidal plates 101 and the side of the trapezoidal plate 101 are the unified direction. The trapezoidal plates 101 defining the left and right surfaces of the plurality of trapezoidal plates 101 are respectively a first segment trapezoidal plate and a second trapezoidal plate.

The inner surface of the first segment trapezoidal plate 10101 is fixed on the rotation shaft 3 by an adhesive form. The second trapezoidal plate is fixed to the fixed strip 104, and the surface of the fixed strip 104 away from the second trapezoidal panel is fixed to the lower main body 5, that is, the fixed strip 104 serves to fix the first support structure 1 to the lower main body 5. The inner surface can be fixed by glue, spot welding or blanching.

In an optional implementation, a limiting slot for restricting the movement of the trapezoidal plate may be disposed in the upper main body 4, and when the upper main body 4 is attached to the lower main body 5, the trapezoidal plate 101 is only retracted towards the rotation shaft direction in the limiting slot, and the state of the first support structure 1 after retracting is as shown in FIG. 12.

With reference to FIG. 13 to FIG. 16, the rotation shaft structure 3 in this embodiment includes:

an axial center 301, a barrel 302 and a spring 303, the axial center 301 includes a first axial center 30102 and a second axial center 30103.

The first axial center 30102 and the second axial center 30103 are connected by the spring 303 and fitted in the barrel 302.

Optionally, each end of the first axial center 30102 and the second axial center 30103 connected to the spring 303 is provided with a positioning post, and there is an interference fit between the spring 303 and the positioning post.

The other end of the first axial center 30102 and the second axial center 30103 are provided with rotation teeth 30201, the two ends of the barrel 302 are provided with fixed teeth 30101.

When the rotation teeth 30201 is engaged with the fixed teeth 30101, the rotation shaft is in a locking state.

When the rotation teeth 30201 is displaced from the fixed teeth 30101, the rotation shaft is in an unlocked state.

Figure 13:
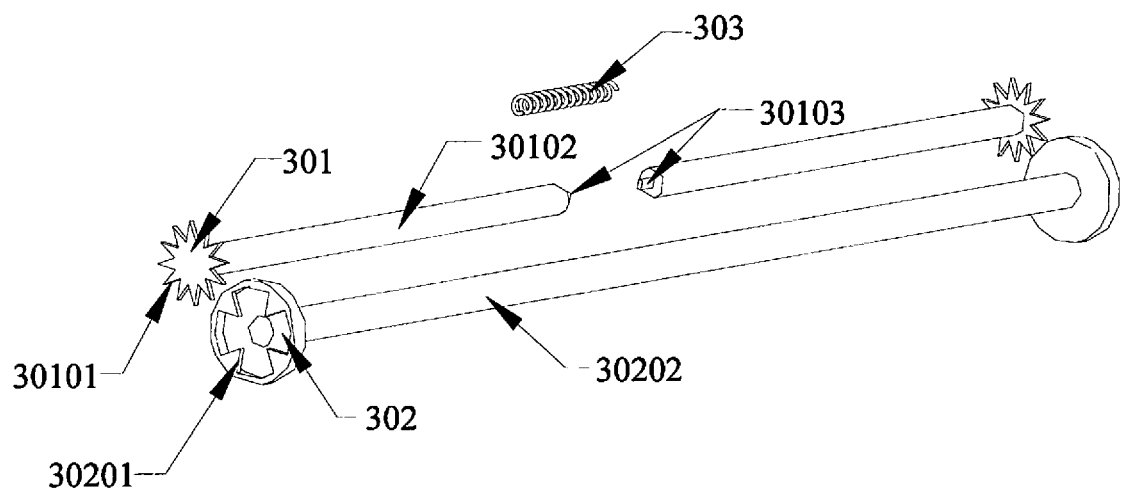
FIG. 13 is a schematic diagram of an exploded structure of a rotation shaft structure according to an embodiment of the present disclosure.
Figure 14:
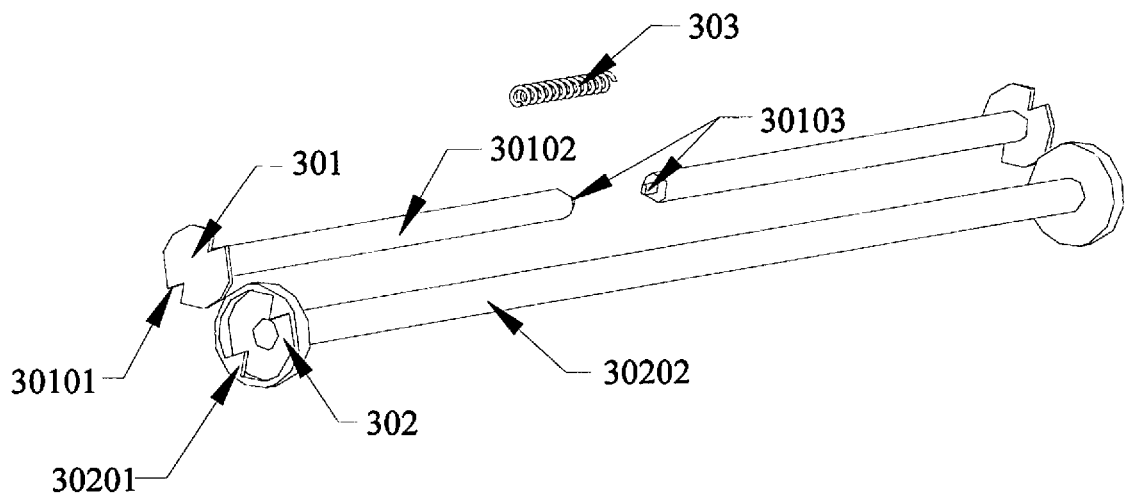
FIG. 14 is a schematic diagram of another exploded structure of a rotation shaft structure according to an embodiment of the present disclosure.
Figure 15:
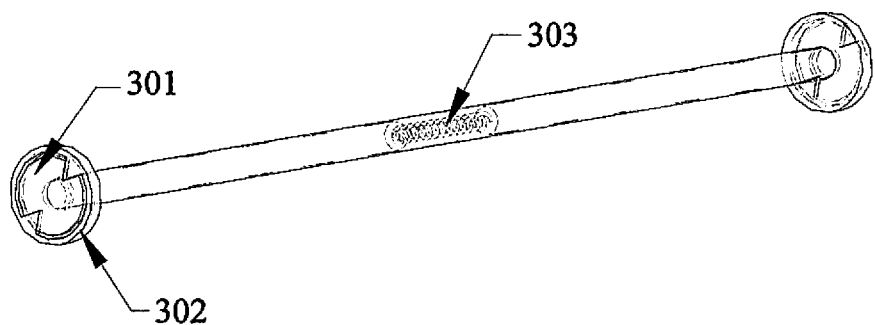
FIG. 15 is a perspective schematic structural diagram of a rotation shaft structure according to an embodiment of the present disclosure.
Figure 16:
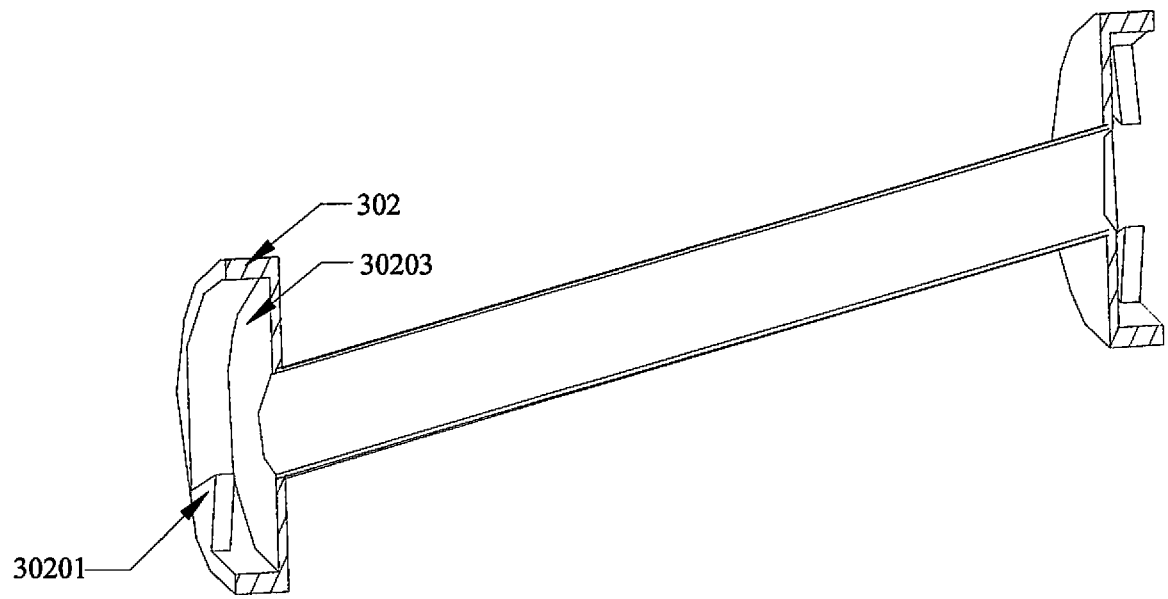
FIG. 16 is a cross-sectional diagram of a shaft barrel in a rotation shaft structure according to an embodiment of the present disclosure.

Optionally, as shown in FIG. 13, the rotation shaft 3 largely includes three parts: an axial center 301, a barrel 302, and a spring 303.

A sleeve 30202 of the barrel 302 is a hollow structure in which the shaft body 30102 of the axial center 301 is fitted. The rotation teeth 30201 at both ends of the barrel 302 cooperate with the fixed teeth 30101 at both ends of the axial center 301, so that the rotation and locking of the rotation shaft 3 can be realized. That is, when the rotation teeth 30201 are separated from the fixed teeth 30101, the rotation shaft 3 can be freely rotated; when the rotation teeth 30201 are engaged with the fixed teeth 30101, the rotation shaft 3 is locked.

The spring 303 is fitted between the two axial center 301 and has an interference fit with the positioning post 30103 on the axial center 301.

When the force is not applied, the rotation teeth 30201 at both ends of the barrel 302 engage with the fixed teeth 30101 at both ends of the axial center 301, and the rotation shaft 3 is in the locked state; when the rotation shaft 3 is required to rotate, the both ends of the axial center 301 are simultaneously fixed, the fixed panel 30104 is sunken, and the rotation teeth 30201 are separated from the fixed teeth 30101, and the rotation shaft 3 can be freely rotated. In an optional implementation, the rotation shaft structure 3 may be other structures, for example, the rotation shaft structure 3 may include only one axis.

Figure 17:
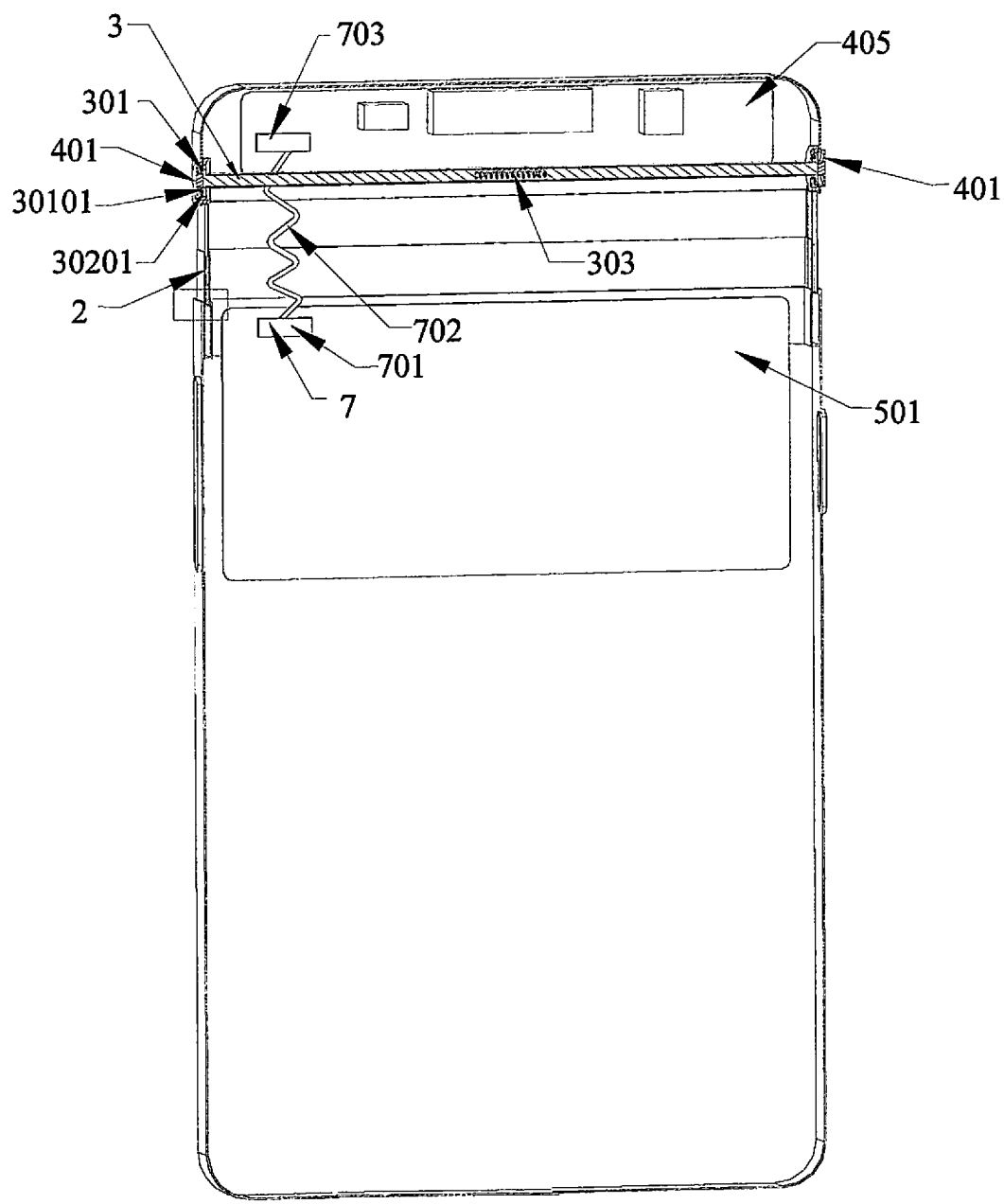
FIG. 17 is a perspective view of a mobile terminal according to an embodiment of the present disclosure.

With reference to FIG. 17, the upper main body 4 may include a button 401 located on the left and right sides of the upper main body 4, a light sensing and proximity sensor, an earpiece, a front camera and a sub-board 405, the light sense and proximity sensors, the earpiece, and the front camera are mounted on the sub-board 405 and disposed inside the upper main body 4.

A main plate 501 is disposed in the lower main body 5, and the main plate 501 and the sub-board 405 are connected by a conductive wire 702, herein the conductive wire 702 is in a bending state when the upper main body 4 is attached to the lower main body 5.

The main body is initially in a small screen mode, at this time, the spring 303 inside the rotation shaft 3 is in an uncompressed state, and the main body support structure 2 is in an unstretched state. The rotation teeth 30201 at both ends of the barrel 302 engage with the fixed teeth 30101 at both ends of the axial center 301, and the rotation shaft 3 is in the locked state.

When it is required to change to the large screen mode, the release button 401 on the both sides of the upper main body 4 is simultaneously pressed and the upper main body 4 is pulled up, and the release button 401 presses the axial center 301 of the rotation shaft 3 inwardly, thereby making the spring 303 in the middle of the two axial center 301 be compressed, and at the same time, because the fixed panel 30104 on the two axial center 301 is sunken, the fixed teeth 30101 at both ends of the axial center 301 are separated from the rotation teeth 30201 at both ends of the barrel 302, and the shaft 3 can be freely rotated.

With the upward pulling of the upper main body 4, the upper main body 4 is gradually separated from the lower main body 5, and the rotation shaft 3 is rotated to release the first support structure 1 and the flexible screen 6 wound thereon, while each of the main support structures 2 is a support plate is then stretched out. As can be seen from the cross-sectional view 27, the daughter board 405 is separated from the mainboard 501, but the extension of the Z-shaped structure of the conductive wire body 702 does not affect the connection of the sub-board 405 to the mainboard 501. As can be seen from the partial enlarged view 28, each of the support plates of the main body support structure 2 has a tensile locking structure between the first support sub-structure 201 and the second support sub-structure 202 as an example, when the main support structure 2 extends, the first support sub-structure 201 and the second support sub-structure 202 are relatively slid, until the locking convex hull 20101 of the head of the first support sub-structure 201 contacts the locking step 20202 at the end of the second support sub-structure 202, it needs to be stretched slightly to make the locking convex hull 20101 passes over the locking step 20202 and enters the locking groove 20201, the second support sub-structure 202 does not completely slide out of the cavity of the first support sub-structure 201, and is in a temporarily fixed position. At this time, the release button 401 is released, the spring 303 rebounds, and the fixed teeth 30101 at both ends of the axial center 301 re-engage with the rotation teeth 30201 at both ends of the barrel 302, and the shaft 3 is locked.

Before stretching and after stretching, the main body changes from the small screen mode to large screen mode.

When it is required to switch from the large screen mode to the small screen mode, the release button 401 on both sides of the upper main body 4 is simultaneously pressed and the upper main body 4 is pressed with a slight force. The release button 401 presses the axial center 301 of the rotation shaft 3 inwardly, thereby compressing the spring 303 in the middle of the two axial centers 301, and at the same time, because the fixed panel 30104 on the axial center 301 is sunken, the fixed teeth 30101 at both ends of the axial center 301 are separated from the rotation teeth 30201 at both ends of the barrel 302, and at this time, the rotation shaft 3 can be rotated, and as the upper main body 4 sinks, the first support structure 1 and the flexible screen 6 thereon are rotated and retracted.

With the depression of the upper main body 4, to partially enlarge the locking structure between the first support sub-structure 201 and the second support sub-structure 202 shown in FIG. 28, the locking convex hull 20101 passes over the locking step 20202 and leaves the locking groove 20201, the second support sub-structure 202 may retract into the cavity of the first support sub-structure 201. Under the same principle, each support plate of the main body support structure 2 is retracted into the cavity, and the main body returns to the small screen mode.

Based on the above structure, the mobile phone adopting the present design can realize the extension and shortening of the screen, allow the mobile phone to switch between the large screen structure and the small screen structure, but the matching hardware and software systems are also required to complete the conversion from the large screen display to the small screen display.

Figure 18:
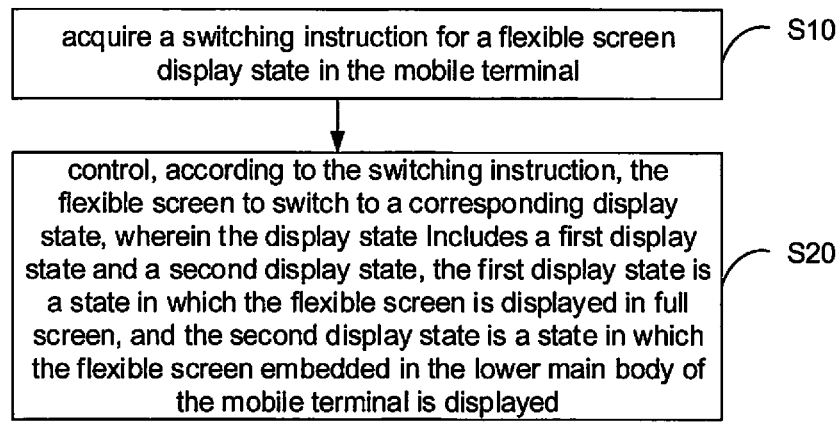
FIG. 18 is a schematic flowchart of a first embodiment of a display method according to the present disclosure.

With reference to FIG. 18, FIG. 18 is a schematic flow-chart of a first embodiment of a display method according to the present disclosure.

Based on the above embodiment, the present disclosure further provides a display method, which may be applied to the mobile terminal according to any one of the above embodiments, and the display method includes:

Step S10, acquiring a switching instruction of a flexible screen display state in the mobile terminal.

The present embodiment provides a display method that may be applied to the mobile terminal according to any one of the above embodiments, that is, to a mobile terminal comprising a flexible screen, herein the flexible screen is located in two portions in the upper main body and the lower main body, which may be defined as a flexible screen fixed portion and a flexible screen movable portion, and the differences between the flexible screen fixed portion and the flexible screen movable portion are that the flexible screen movable portion is located above and closely attached to the first support structure for curling and flattening as a whole. When the flexible screen curls, the flexible screen movable portion will be accommodated inside the main body and not be displayed outside. When the flexible screen is flattened, the flexible screen movable portion is flattened and displayed outside, and the screen size of the main body is increased.

During use, the mobile terminal may be extended, so that the flexible screen curled in the upper main body is gradually deployed. In this case, for the convenience of the user, the flexible screen needs to be controlled for corresponding display.

Optionally, step S10 may include:

receiving a flexible screen display state switching instruction triggered by a menu button displayed on the flexible screen in the mobile terminal.

First, a menu button may be set on the mobile terminal, and the menu button may be a physical button or a virtual button, and the menu button is used to control the flexible screen to perform the corresponding display. If the user stretches the mobile terminal or shortens the mobile terminal during use, that is, the mobile terminal is stretched from the small screen to the large screen or shortened from the large screen to the small screen, the user may trigger the corresponding switching instruction through the menu button.

At step S20, the flexible screen is controlled to switch to the corresponding display state according to the switching instruction, herein the display state at least includes: a first display state and a second display state, herein the first display state is a state in which the flexible screen is displayed in full screen, and the second display state is a state in which the flexible screen embedded in the lower main body of the mobile terminal is displayed.

After the user triggers the switching instruction, the mobile terminal receives the switching instruction generated in step S10, and controls the corresponding portion of the flexible screen to display, that is, controls the flexible screen to switch to the corresponding display state. In this embodiment, the flexible screen is displayed. There are two types: the first display state and the second display state, herein the first display state is the state in which the flexible screen is displayed in full screen, and may be defined as a large screen display state; the second display state is the state in which the flexible screen embedded in the lower main body of the mobile terminal is displayed, and may be defined as a small screen display state. In an optional implementation, the display state may further include a third display state in which the partial flexible screen located in the upper main body and the flexible screen embedded in the lower main body of the mobile terminal are displayed together, and may be defined as the middle screen display state, and the screen size of the middle screen is between the large screen and the small screen. The process of specifically controlling the display of the flexible screen may use the known technologies in the art, and details are not described herein again.

It should be specially noted that in actual use, the display state of the flexible screen can be determined by the user, that is, the user can control the flexible screen in the mobile terminal to enter any display state. However, when the mobile terminal is not stretched, since the partial flexible screen is located in the upper main body, the user does not see the corresponding content, and thus may cause waste. It is recommended that the user control the flexible screen according to the degree of stretching of the mobile terminal during use to display correspondingly.

In this embodiment, the flexible screen is controlled to be switched to the corresponding display state according to the switching instruction of the flexible screen display state in the mobile terminal, herein the display state includes at least: the first display state, the second display state, and the third display state, herein the first display state is a state in which the flexible screen is displayed in full screen, and the second display state is a state in which the partial flexible screen located in the upper main body and the flexible screen embedded in the lower main body of the mobile terminal are displayed together, and the third display state is a state in which the flexible screen embedded in the lower main body of the mobile terminal is displayed. The present disclosure can control the flexible screen to make it in the corresponding display state according to the user operation, which is convenient for the user to use.

Figure 19:
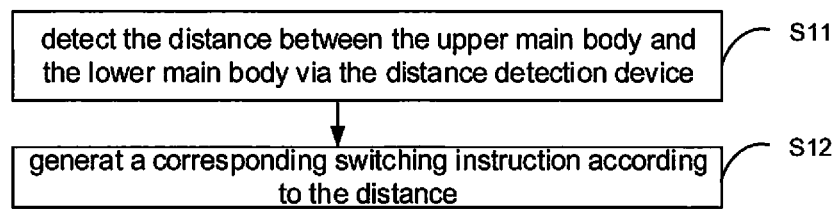
FIG. 19 is a schematic diagram of a refinement process of acquiring a switching instruction of a flexible screen display state in the mobile terminal according to an embodiment of the present disclosure.

With reference to FIG. 19, FIG. 19 is a schematic diagram of a refinement process of acquiring a switching instruction of a flexible screen display state in the mobile terminal according to an embodiment of the present disclosure.

Based on the above embodiment, step S10 may further include:

Step S11, detecting a distance between the upper main body and the lower main body by a distance detection device;

Step S12, generating the corresponding switching instruction according to the distance.

In order to avoid unnecessary waste caused by the user operating the mobile terminal to control the flexible screen display state and the mobile terminal's degree of stretch, the distance detection device is further provided in the embodiment in the mobile terminal for detecting the distance between the upper main body and the lower main body of the mobile terminal. Optionally, the distance detection device may be an infrared detection device, herein the infrared emitting device of the infrared detection device is disposed on a lower main body, and the infrared receiving device is disposed at the corresponding position on the upper main body. Of course, the positions of the infrared emitting device and the infrared receiving device can be interchanged, and only the infrared light emitted by the infrared emitting device may be received by the infrared receiving device, so as to measure the distance between the upper main body and the lower main body. The distance detection device can also be other distance detection devices.

In this embodiment, the infrared detection device detects the distance between the upper main body and the lower main body, and then generates the corresponding switching instruction according to the distance between the upper main body and the lower main body, and the mobile terminal controls the flexible screen to make it be switched to the corresponding display state according to the generated switching instruction, that is, be switched to the first display state, the second display state or the third display state.

It should be particularly noted that in the embodiment, the corresponding switching instruction is automatically generated according to the distance between the upper part of the main body and the lower main body obtained by the distance detection device, and if the displayed picture is similarly processed, display contents of the displayed picture are also different based on the different screen. The user may slowly stretch the mobile terminal during use, so that they can constantly see new pictures and improve the fun. For example, when displaying pictures on a small screen, only the upper body of the beauty is displayed. When the mobile terminal is slowly stretched, the lower body of the beauty can be gradually displayed while displaying the upper body of the beauty.

In this embodiment, the distance detection device detects the distance between the upper main body and the lower main body of the mobile terminal, and generates the corresponding switching instruction according to the distance, so that the flexible screen in the mobile terminal can be automatically switched to the corresponding display state, thereby avoiding unwanted waste caused by a mismatch between the display state of the flexible screen controlled by the mobile terminal via the use's operation and the degree of stretching of the mobile terminal, and can improve the fun of the mobile terminal.

Figure 20:
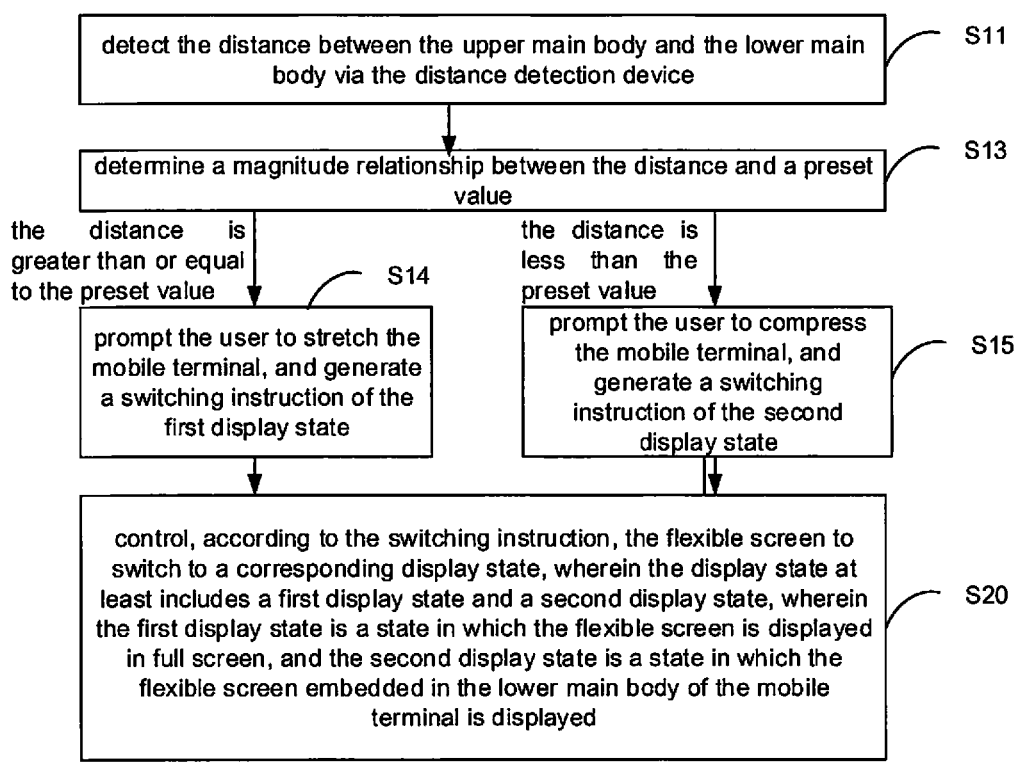
FIG. 20 is a schematic flowchart of a second embodiment of a display method according to the present disclosure.

With reference to FIG. 20, FIG. 20 is a schematic flowchart of a second embodiment of a display method according to the present disclosure.

Based on the above embodiment of the display method of the present disclosure, step S10 may further include:

Step S13, determining a relationship between the distance and a preset value;

Step S14, if the distance is greater than or equal to the preset value, prompting the user to stretch the mobile terminal, and generating a switching instruction of the first display state;

Step S15, if the distance is less than the preset value, prompting the user to compress the mobile terminal, and generating a switching instruction of the second display state.

In this embodiment, the mobile terminal is configured with only two display states, that is, the first display state and the second display state, and is preset with the preset value. In this embodiment, the preset value is the maximum length that the mobile terminal can be stretched. The intermediate value may be set to other values in an optional implementation.

When the mobile terminal is stretched, the detected distance and the preset value may be determined according to the distance detected by the distance detection device, and if the distance is greater than or equal to the preset value, prompting the user to stretch the mobile terminal, and generating the switching instruction of the first display state; if the distance is less than the preset value, prompting the user to compress the mobile terminal, and generating the switching instruction of the second display state. The flexible screen is controlled to perform display on the large screen or the small screen according to the corresponding switching instruction.

Embodiments of the present disclosure also provide a computer-readable storage medium storing computer-executable instructions, and the foregoing display methods are implemented when the computer-executable instructions are executed.

A person skilled in the art may understand that all or some steps, systems, and functional modules/units in the devices in the methods disclosed above may be implemented as software, firmware, hardware, and appropriate combinations thereof. In a hardware implementation, the division between functional modules/units mentioned in the above description does not necessarily correspond to the division of physical components; for example, one physical component may have multiple functions, or one function or step may be executed cooperatively by several physical components. Some or all components may be implemented as software executed by a processor, such as a digital signal processor or a microprocessor, or as hardware, or as an integrated circuit, such as an application specific integrated circuit. Such software may be distributed on computer-readable medium, which may include computer storage medium (or non-transitory medium) and communication medium (or transitory medium). As is well known to a person skilled in the art, the term computer storage medium includes volatile and non-volatile, removable and non-removable medium implemented in any method or technology used to store information such as computer-readable instructions, data structures, program modules or other data. Computer storage medium includes, but is not limited to, Random Access Memory (RAM), Read-Only Memory (ROM), Electrically Erasable Programmable Read-only Memory (EEPROM), Flash Memory or other memory technology, Compact Disc Read-Only Memory (CD-ROM), digital versatile disc (DVD) or other optical disk storage, magnetic cartridge, magnetic tape, disk storage or other magnetic storage device, or any other medium used to store desired information and which may be accessed by a computer. In addition, it is well known to a person skilled in the art that a communication medium typically includes computer-readable instructions, data structures, program modules, or other data in a modulated data signal such as a carrier wave or other transmission mechanism, and may include any information delivery medium.

A person skilled in the art may understand that the technical solutions of the present disclosure may be modified or equivalently replaced without departing from the spirit and scope of the technical solutions of the present disclosure, which should all be covered by the scope of the claims of the present disclosure.

INDUSTRIAL APPLICABILITY

The mobile terminal of the present disclosure includes a main body and a flexible screen disposed on the main body, and the main body includes an upper main body and a lower main body provided separately. The mobile terminal further includes a rotation shaft structure and a support structure for supporting the flexible screen. The rotation shaft structure is located in the upper main body, and the first support structure winds around the rotation shaft structure; a portion of the flexible screen is embedded in the lower main body and located on a surface facing a user; a back surface of the other portion is attached to a surface of the first support structure remote from the rotation shaft structure, herein the surface of the flexible screen facing the user is a front surface; when the upper main body is separated from or attached to the lower main body, the rotation shaft structure is rotated to realize the deployment and retraction of the first support structure. By the above manner, the mobile terminal of the present disclosure includes the upper main body and the lower main body, and the extension and shortening of the screen of the mobile terminal are realized by the rotation shaft structure and the first support structure provided in the upper main body by utilizing the characteristics of the bendable accommodation of the flexible screen. When the user needs a large screen, the upper main body is separated from the lower main body, and the flexible screen and the first support structure are released through the rotation shaft structure, so that the screen of the mobile terminal is increased; when the large screen is not required, the upper main body is attached to the lower main body, the flexible screen and the first support structure are retracted through the rotation shaft structure, so that the screen of the mobile terminal becomes smaller, thereby realizing free switch of the mobile terminal between the large screen and the small screen and having dual advantages of both the large screen and the small screen.

What is claimed is:

1. A mobile terminal, comprising a main body and a flexible screen disposed on the main body, the main body comprising an upper main body and a lower main body separately disposed, the mobile terminal further comprising a rotation shaft structure and a first support structure for supporting the flexible screen,
    the rotation shaft structure being located in the upper main body and the first support structure winding around the rotation shaft structure;
    a portion of the flexible screen being embedded in the lower main body and being located on a surface facing a user; a back surface of the other portion of the flexible screen being attached to a surface of the first support structure remote from the rotation shaft structure, wherein the surface of the flexible screen facing the user is a front surface;
    when the upper main body being separated from or attached to the lower main body, deployment and retraction of the first support structure being realized by rotating the rotation shaft structure.

2. The mobile terminal according to claim 1, wherein the mobile terminal further comprises:
    a second support structure, the second support structure is attached to two sides, or a back surface, or the two sides and the back surface of the mobile terminal, and supports the upper main body and the lower main body to make them in a same plane when the upper main body is separated from or attached to the lower main body.

3. The mobile terminal according to claim 2, wherein the second support structure comprises a first support sub-structure and a second support sub-structure slidably connected to the first support sub-structure,
    an end of the first support sub-structure along a sliding direction and away from the second support sub-structure is fixedly connected to the upper main body, and an end of the second support sub-structure along the sliding direction and away from the first support sub-structure is fixedly connected to the lower main body.

4. The mobile terminal according to claim 3, wherein the second support structure further comprises a locking structure,
    the locking structure comprises a locking convex hull at the other end of the first support sub-structure, and a locking step and a locking groove at one end of the second support sub-structure;
    when the locking convex hull is located in the locking groove, the locking step catches the locking convex hull.

5. The mobile terminal according to claim 1, wherein the first support structure comprises a trapezoidal plate having a trapezoidal cross section, a connection structure, and a fixed bar, and the trapezoidal plate comprises an upper bottom surface, a lower bottom surface, and trapezoidal surfaces at both ends of the trapezoidal plate and two side surfaces intersecting with the trapezoidal surface,
    the connection structure connects side surfaces of adjacent trapezoidal plates and sequentially connects a plurality of trapezoidal plates;
    the flexible screen is attached to the lower bottom surface of the trapezoidal plate;
    one of the trapezoidal plates located on either side of the plurality of trapezoidal plates connected in sequence is fixedly connected to the shaft structure, and the other trapezoidal plate is fixed to an inner surface of the lower main body via the fixed bar.

6. The mobile terminal according to claim 5, wherein the first support structure further comprises: a connection chain,
    a hole is disposed on the trapezoidal surface of the trapezoidal plate, and the connection chain connects adjacent trapezoidal plates through holes in the adjacent trapezoidal plates.

7. The mobile terminal according to claim 5, wherein the connection structure comprises:
    a circular hole and a connection rod located on either side surface of the trapezoidal plate, wherein the circular holes from each side surface of the trapezoidal plate are in a straight line;
    the connection rod passes through circular holes from adjacent side surfaces of the adjacent trapezoidal plates, to connect the plurality of trapezoidal plates.

8. The mobile terminal according to claim 1, wherein the rotation shaft structure comprises:
    an axial center, a barrel and a spring, the axial center comprising a first axial center and a second axial center;
    the first axial center and the second axial center are connected via the spring and attached in the barrel, and the first support structure winds around the barrel.

9. The mobile terminal according to claim 8, wherein one end of the first axial center connected to the spring and one end of the second axial center connected to the spring are provided with a positioning post, respectively, and there is an interference fit between the spring and the positioning post.

10. The mobile terminal according to claim 9, wherein the other end of the first axial center and the other end of the second axial center are provided with fixed teeth, and both ends of the barrel are provided with rotation teeth;
    when the rotation teeth are engaged with the fixed teeth, the rotation shaft is in a locked state;
    when the rotation teeth is misaligned with the fixed teeth, the rotation shaft is in an unlocked state.

11. The mobile terminal according to claim 8, wherein the upper main body comprises: a button on a left or right side of the upper main body, a light sensation and a proximity sensor, an earpiece, a front camera and a sub-board; the light sensation, the proximity sensor, the earpiece and the front camera are mounted on the sub-board and disposed inside the upper main body;

a mainboard is disposed in the lower main body, and the mainboard and the sub board are connected by a conductive wire, wherein the conductive wire is in a bent state when the upper main body is attached to the lower main body.

12. A display method, applied to the mobile terminal according to claim 1, the display method comprising:

acquiring a switching instruction for a flexible screen display state in the mobile terminal;

controlling, according to the switching instruction, the flexible screen to switch to a corresponding display state, wherein the display state comprises a first display state and a second display state, wherein the first display state is a state in which the flexible screen is displayed in full screen, and the second display state is a state in which the flexible screen embedded in the lower main body of the mobile terminal is displayed.

13. The display method according to claim 12, wherein the step of acquiring the switching instruction for the flexible screen display state in the mobile terminal comprises:

receiving a flexible screen display state switching instruction triggered through a menu button displayed on the flexible screen of the mobile terminal.

14. The display method according to claim 12, wherein the mobile terminal further comprises: a distance detection device for detecting a distance between the upper main body and the lower main body of the mobile terminal, wherein the step of acquiring the switching instruction for the flexible screen display state in the mobile terminal further comprises:

detecting the distance between the upper main body and the lower main body via the distance detection device;

generating a corresponding switching instruction according to the distance.

15. The display method according to claim 14, wherein after the step of detecting the distance between the upper main body and the lower main body via the distance detection device, the method further comprises:

determining a relationship between the distance and a preset value;

when the distance is greater than or equal to the preset value, prompting the user to stretch the mobile terminal, and generating a switching instruction for the first display state;

when the distance is less than the preset value, prompting the user to compress the mobile terminal, and generating a switching instruction for the second display state.

16. The display method according to claim 12, wherein the display state further comprises: a third display state, wherein the third display state is a state in which partial flexible screen located in the upper main body and the flexible screen embedded in the lower main body of the mobile terminal are displayed together.

* * * * *